United States Patent
Kato et al.

(10) Patent No.: US 9,206,887 B2
(45) Date of Patent: Dec. 8, 2015

(54) CHAIN GUIDE AND CHAIN TRANSMISSION DEVICE

(75) Inventors: Akio Kato, Iwata (JP); Shinji Oishi, Iwata (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 14/232,920

(22) PCT Filed: Jul. 12, 2012

(86) PCT No.: PCT/JP2012/067808
§ 371 (c)(1),
(2), (4) Date: Jan. 15, 2014

(87) PCT Pub. No.: WO2013/011916
PCT Pub. Date: Jan. 24, 2013

(65) Prior Publication Data
US 2014/0162820 A1    Jun. 12, 2014

(30) Foreign Application Priority Data

Jul. 20, 2011 (JP) .................................. 2011-158983
Jul. 20, 2011 (JP) .................................. 2011-158989

(51) Int. Cl.
*F16H 7/12*      (2006.01)
*F16H 7/08*      (2006.01)
(Continued)

(52) U.S. Cl.
CPC *F16H 7/08* (2013.01); *F16C 33/62* (2013.01); *F16H 7/18* (2013.01); *F16C 13/006* (2013.01); *F16C 19/466* (2013.01); *F16C 2202/04* (2013.01); *F16C 2361/63* (2013.01);
(Continued)

(58) Field of Classification Search
CPC ........... F16H 2007/0874; F16H 7/1281; F16H 2007/081; F16H 7/1254; F16H 2007/0806
USPC ............................................................ 474/134
See application file for complete search history.

(56) References Cited

U.S. PATENT DOCUMENTS 5,961,411 A     10/1999    Tsutsumi et al.
2004/0247216 A1* 12/2004   Ichikawa et al. .............. 384/546
(Continued)

FOREIGN PATENT DOCUMENTS

JP    08-105499    4/1996
JP    10-184828    7/1998
(Continued)

OTHER PUBLICATIONS

International Search Report issued Sep. 11, 2012 in International (PCT) Application No. PCT/JP2012/067808.

*Primary Examiner* — Henry Liu
(74) *Attorney, Agent, or Firm* — Wenderoth, Lind & Ponack, L.L.P.

(57) ABSTRACT

The present invention is to suppress wear of outer diameter surfaces of chain guiding rollers (41) in a chain guide and extend the life. Respective shaft ends of a plurality of roller shafts (31) are supported by pairs of facing side plate portions (22) of guide bases (21) arranged to face each other in a one-side part of a timing chain (5) for transmitting torque. Each of the rollers (41) formed by a plurality of chain guiding roller bearings is rotatably supported by each of the plurality of roller shafts (31). Rollers whose surface hardness is greater than surface hardness of the timing chain (5) by 4 points or more of Rockwell hardness are used as the rollers (41), so as to prevent earlier wear of the outer diameter surfaces of the rollers (41) due to contact with the timing chain (5).

8 Claims, 7 Drawing Sheets

(51) Int. Cl.
  *F16H 7/18* (2006.01)
  *F16C 33/62* (2006.01)
  *F16C 19/46* (2006.01)
  *F16C 13/00* (2006.01)
  *F16H 7/20* (2006.01)

(52) U.S. Cl.
  CPC ............. *F16H7/1281* (2013.01); *F16H 7/20* (2013.01); *F16H 2007/0865* (2013.01); *F16H 2007/0893* (2013.01)

(56) References Cited

U.S. PATENT DOCUMENTS

| | | | |
|---|---|---|---|
| 2006/0067597 A1* | 3/2006 | Oishi | 384/572 |
| 2007/0154127 A1* | 7/2007 | Oishi et al. | 384/569 |
| 2008/0273827 A1 | 11/2008 | Fujiwara et al. | |
| 2011/0006597 A1* | 1/2011 | Diekevers et al. | 305/137 |
| 2011/0088506 A1* | 4/2011 | Oishi et al. | 74/569 |
| 2011/0294612 A1* | 12/2011 | Kato | 474/91 |
| 2011/0294613 A1* | 12/2011 | Fuhrmann et al. | 474/111 |
| 2012/0048427 A1* | 3/2012 | Kubota | 148/218 |
| 2012/0118434 A1* | 5/2012 | Konishi et al. | 148/218 |

FOREIGN PATENT DOCUMENTS

| | | |
|---|---|---|
| JP | 2000-266141 | 9/2000 |
| JP | 2008-260995 | 10/2008 |
| WO | 2010/090139 | 8/2010 |

* cited by examiner

CHAIN GUIDE AND CHAIN TRANSMISSION DEVICE

TECHNICAL FIELD

The present invention relates to a chain guide used for adjusting the tension of a chain or for guiding movement of the chain, and a chain transmission device including the chain guide.

BACKGROUND ART

In a chain transmission device for driving a camshaft in which a timing chain is looped over a driving sprocket attached to a crankshaft and a driven sprocket attached to the camshaft, a pivotable chain guide is provided on one side of a slack side of the timing chain, and adjustment force of a chain tensioner is applied to a remote end of the chain guide remote from the center of pivoting motion of the chain guide to tighten the timing chain, thereby preventing the chain from slackening and flapping.

Another chain guide is fixed in position on the side of a tight side of the timing chain to guide the movement of the timing chain, thereby to prevent flapping of the chain.

As the chain guide for adjusting tensile force and for guiding the movement of the timing chain, a type of chain guide for guiding the surface of the timing chain by sliding contact is known. However, there is a problem that movement resistance of the timing chain is large and a transmission torque loss is significant.

In order to solve such a problem, the below-identified Patent Document 1 proposes a chain guide in which both ends of a plurality of roller shafts arranged in a curve form are supported by a guide base elongated in the moving direction of a timing chain, each of rollers formed by roller bearings is rotatably supported on each of the plurality of roller shafts, and the timing chain is movably supported by the plurality of rollers.

In the above chain guide, since the timing chain is guided by a roll of the plurality of rollers, there is a characteristic that the movement resistance of the timing chain is small and a transmission torque loss is insignificant.

CITATION LIST

Patent Document

Patent Document 1: International Publication No. 2010/090139

SUMMARY OF THE INVENTION

Problem to be Solved by the Invention

With the chain guide described in Patent Document 1, nothing is mentioned about the surface hardness of the rollers for guiding the movement of the timing chain. If rollers whose surface hardness is lower than necessary are adopted, outer diameter surfaces are worn away earlier due to contact with the timing chain moving at high speed. When the surface hardness of the rollers is increased more than necessary in order to suppress the wear, manufacture of the rollers becomes difficult, cost is increased, and cracking is easily generated.

An object of the present invention is to suppress the wear of the outer diameter surfaces of the chain guiding rollers in the chain guide and extend the life.

Means for Solving the Problem

In order to achieve the above object, the present invention provides a chain guide including a guide base configured to be arranged to extend along a portion of the outer periphery of a timing chain, the guide base having side plate portions elongated in a direction in which the timing chain is moved, a plurality of roller shafts supported by shaft support portions formed in the side plate portions of the guide base, the roller shafts being spaced from each other in the longitudinal direction of the side plate portions, and a plurality of chain guiding rollers rotatably supported on the respective roller shafts, wherein the rollers have a surface hardness higher than the surface hardness of the timing chain by 4 points or more in Rockwell hardness.

The present invention also provides a chain transmission device including a timing chain looped over a driving sprocket and a driven sprocket, a pivotable chain guide provided on one side of a slack side of the timing chain, and guiding the movement of the timing chain, and a chain tensioner for applying adjustment force to a remote end of the chain guide remote from the center of pivoting movement of the chain guide, thereby pressing the remote end against the timing chain, wherein the chain guide according to the present invention is used as the pivotable chain guide.

This chain transmission device may further includes a fixed chain guide provided on one side of a tight side of the timing chain, and guiding the movement of the timing chain, wherein the chain guide according to the present invention is used as the fixed chain guide.

In the chain guide according to the present invention, since the surface hardness of the rollers is higher than the surface hardness of the timing chain by 4 points or more in Rockwell hardness as described above, wear of outer diameter surfaces of the rollers can be suppressed.

Such timing chains include a roller chain and a silent chain. In these timing chains, surface hardness of plates of the chain, which are bendably coupled by pins, is about HRC 50 to 54 in Rockwell hardness. Thus, the rollers preferably have a surface hardness of HRC 58 or more in Rockwell hardness.

If the Rockwell hardness is higher than necessary, it becomes difficult to manufacture the rollers, and also their toughness decreases, increasing the possibility of cracking. Thus, the surface hardness of the rollers is preferably HRC 64 or less in Rockwell hardness.

To increase the surface hardness of the rollers to the level as described above, the rollers may be made of high-carbon steel, and after forming the rollers, the rollers may be subjected to high frequency quenching or bright quenching. Otherwise, the rollers may be made of low-carbon steel, and after forming the rollers, the rollers may be subjected to carburizing quenching or nitrocarburizing quenching.

According to the present invention, after forming the rollers from high-carbon steel, the rollers are subjected to -high frequency quenching or after forming the rollers from low-carbon steel, the rollers are subjected to carburizing quenching or nitrocarburizing quenching. With this arrangement, a hardened layer whose hardness is greater than the surface hardness of the timing chain by 4 points or more in Rockwell hardness is formed on the surface of the rollers, and a soft layer is formed under the hardened layer. Thus, in comparison to a case where the entire rollers are hardened by bright quenching, the toughness of the rollers can be enhanced, and damage to the rollers can be effectively prevented.

By using needle roller bearings or cylindrical roller bearings having an outer race and a plurality of roller elements received in the outer race as the rollers, the rollers can be smoothly rotated by contact with the chain, and movement resistance of the chain can be decreased to a large extent.

Ife needle roller bearings are used as the rollers, and their races are drawn into a shell shape and the shell-shaped outer race is quenched to form the hardened layer on the surface, the depth of the hardened layer is preferably about 0.1 to 0.3 mm.

Effect of the Invention

In the present invention, as described above, since the surface hardness of the rollers is higher than the surface hardness of the chain by 4 points or more in Rockwell hardness, the wear of the outer diameter surfaces of the rollers can be suppressed and the life can be extended.

DETAILED DESCRIPTION OF THE INVENTION

Figure 1:
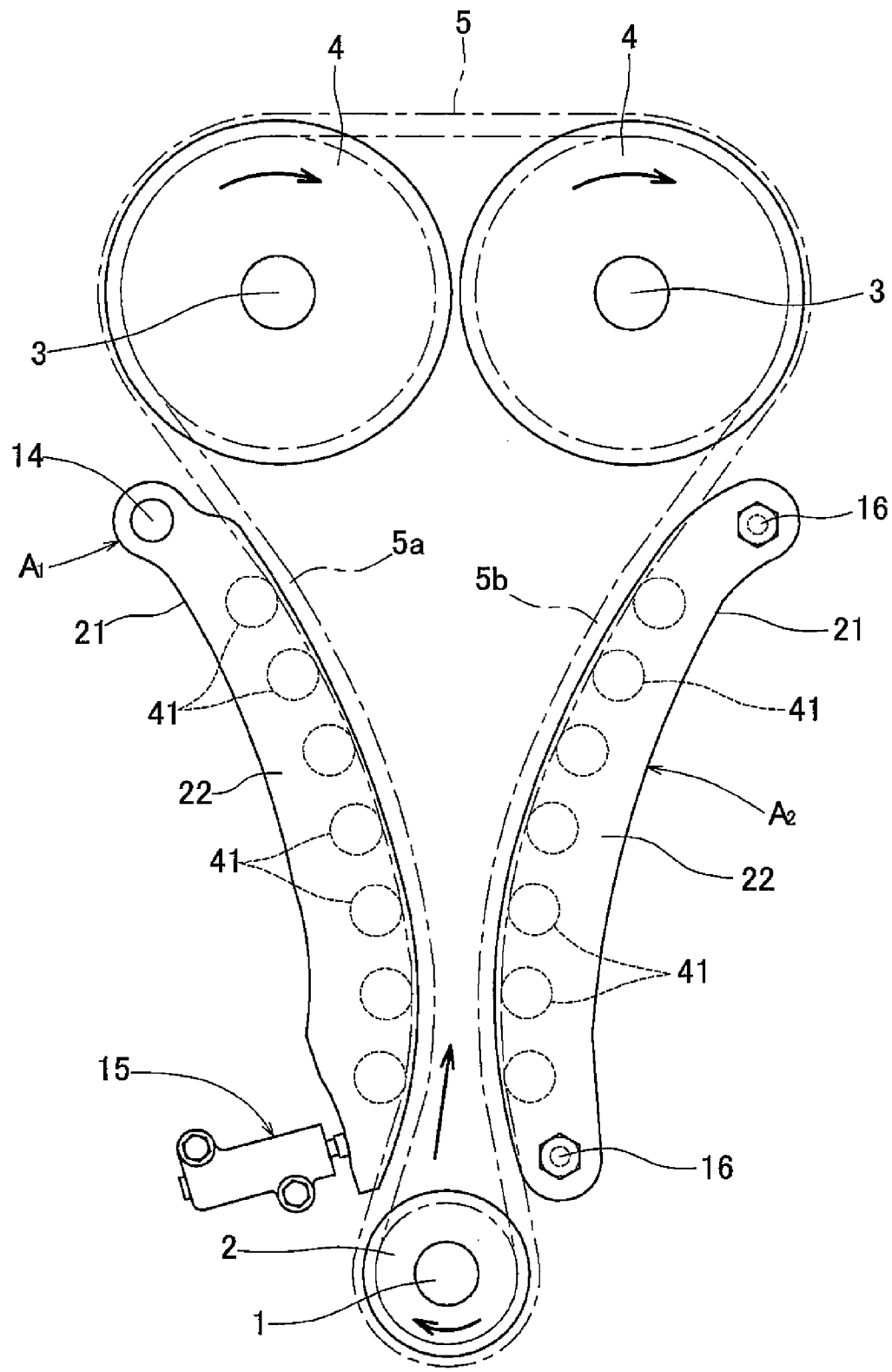
FIG. 1 A schematic view showing of a chain transmission device embodying the present invention.

Hereinafter, an embodiment of the present invention will be described based on the drawings. FIG. 1 shows a chain transmission device for driving camshafts, in which a timing chain 5 is looped over a driving sprocket 2 attached to a shaft end of a crankshaft 1 and driven sprockets 4 attached to respective shaft ends of two camshafts 3.

The timing chain 5 may be a roller chain or a silent chain.

The crankshaft 1 is rotated in the direction shown by the corresponding arrow of FIG. 1. By the rotation of the crankshaft 1, the timing chain 5 moves in the direction shown by the corresponding arrow of FIG. 1. As a result, the portion of the chain 5 extending from the driving sprocket 2 to the driven sprocket 4 positioned on the left side of FIG. 1 becomes slack (this side of the chain is thus referred to as the "slack side 5a"), and the portion of the chain extending from the other driven sprocket 4 to the driving sprocket 2 becomes tight ("tight side 5b"). A chain guide $A_1$ is provided on one side of the slack side 5a of the chain 5.

The chain guide $A_1$ is elongated in the moving direction of the timing chain 5. The chain guide $A_1$ has its upper end supported by a pivot shaft 14 protruding from an engine block so as to be pivotable about the pivot shaft 14. Adjustment force of a chain tensioner 15 is applied to the lower end, i.e. the end remote from the pivot shaft 14, of the chain guide $A_1$, so that this end of the chain guide is pressed against the slack side 5a of the chain.

A chain guide $A_2$ is provided on the opposite side of the tight side 5b of the timing chain 5. As with the pivotable chain guide $A_1$, this chain guide $A_2$ is elongated in the moving direction of the timing chain 5. Both ends thereof are fixed by fastening bolts 16 screwed into the engine block, so that movement of the timing chain 5 is guided.

The pivotable chain guide $A_1$ and the fixed chain guide $A_2$ have the same configuration, except that the pivotable chain guide $A_1$ has at one end thereof an insertion hole 24 into which a shaft can be is inserted, whereas the fixed chain guide $A_2$ has at both ends thereof insertion holes into which bolts can be inserted.

Therefore, the configuration of only the pivotable chain guide $A_1$ will be described below. Regarding the fixed chain guide $A_2$, the same reference numerals will be given to the same parts and description thereof will be omitted.

Figure 2:
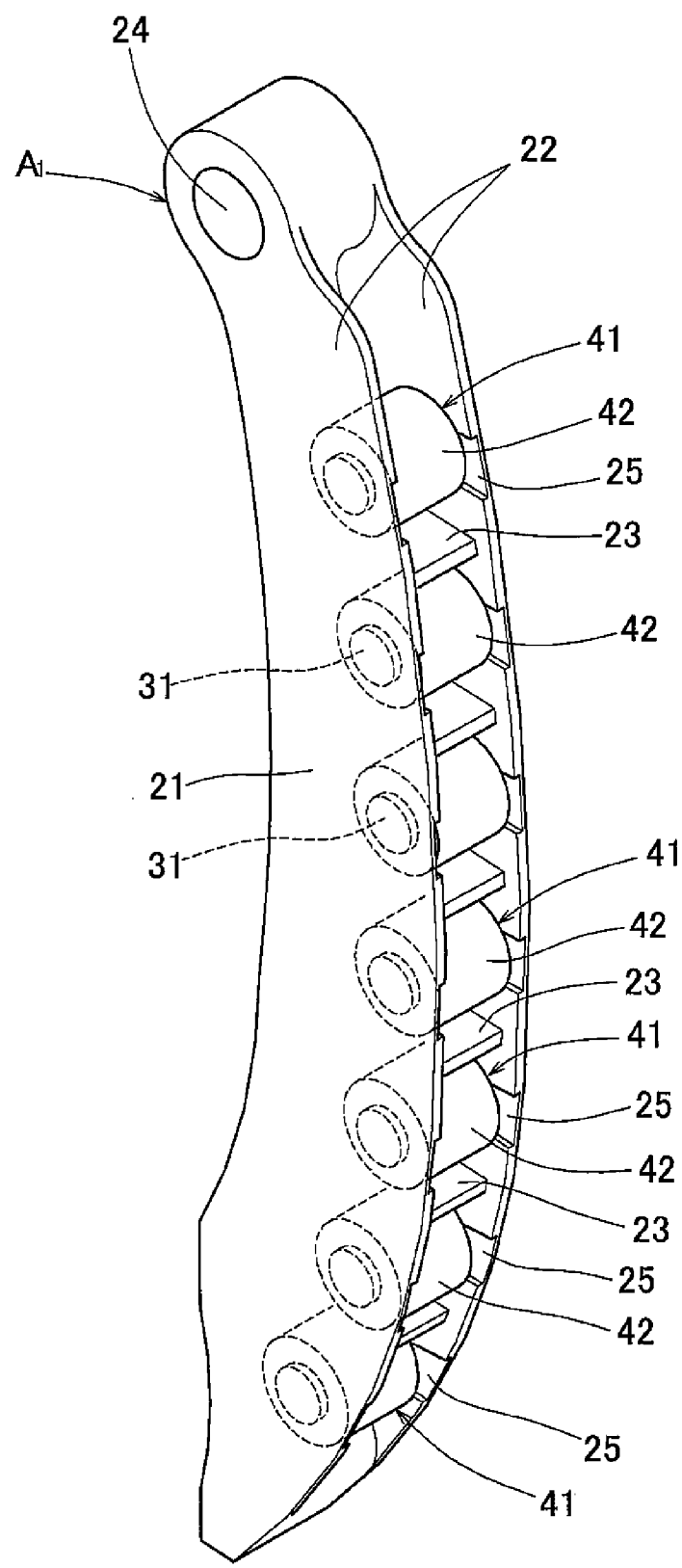
FIG. 2 A perspective view of a chain guide according to the present invention.
Figure 3:
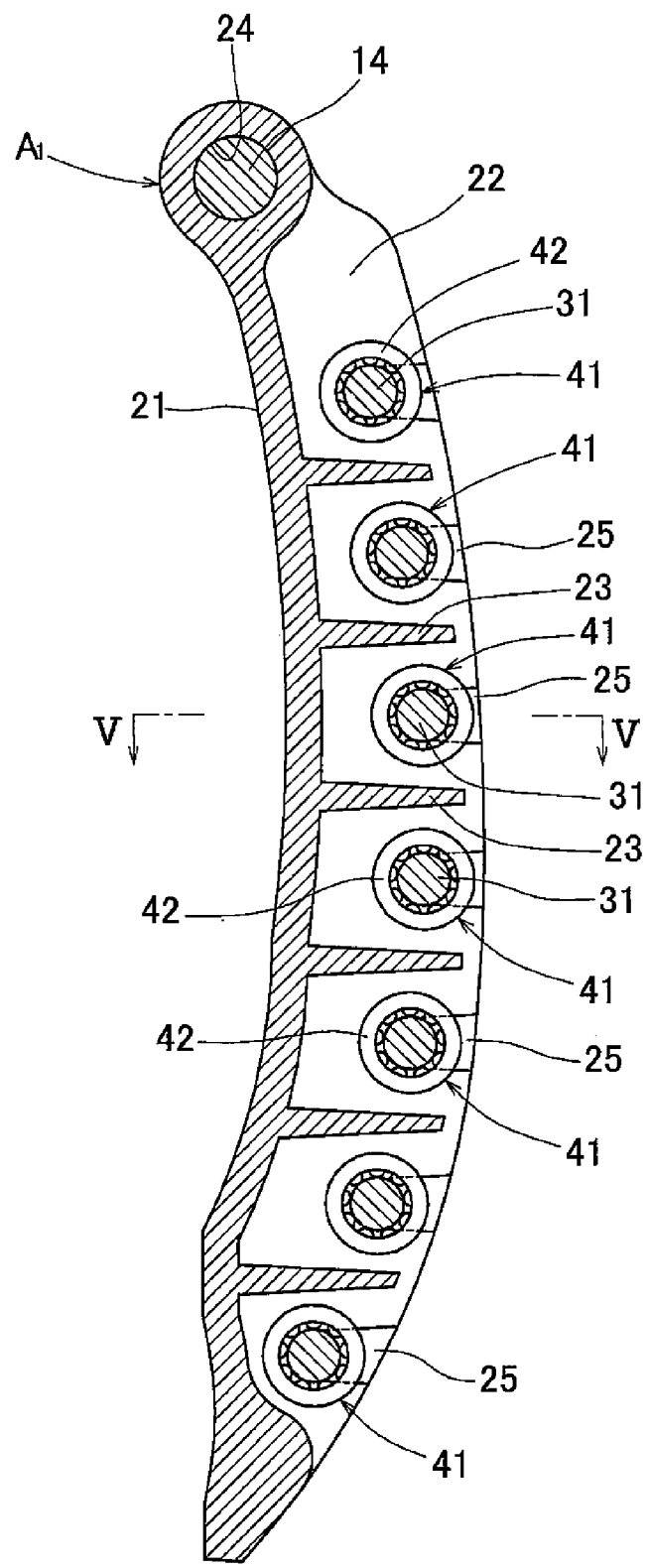
FIG. 3 A vertically sectional view of FIG. 2.
Figure 4:
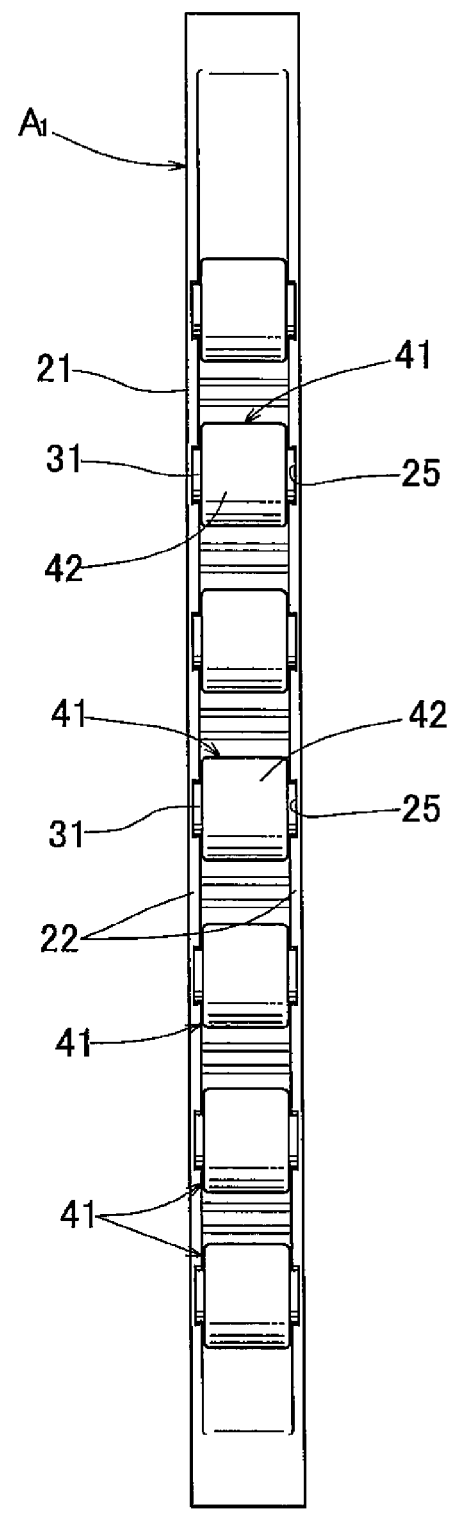
FIG. 4 A right side view of FIG. 3.
Figure 5:
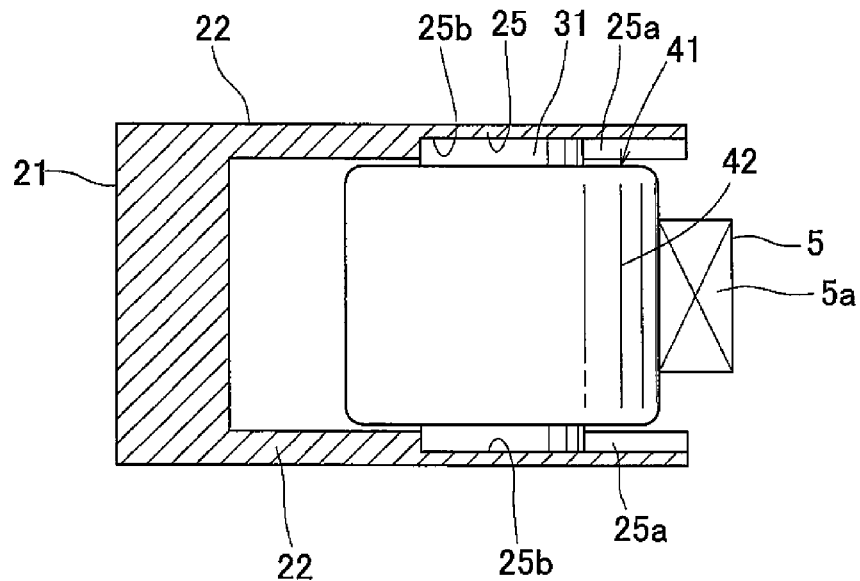
FIG. 5 A sectional view taken along line V-V of FIG. 3.

As shown in FIGS. 2 to 4, the chain guide $A_1$ includes a guide base 21 elongated in the moving direction of the timing chain 5, a plurality of roller shafts 31 spaced from each other in the longitudinal direction of the guide base 21, and a plurality of chain guiding rollers 41 rotatably supported on the respective roller shafts 31.

The guide base 21 includes an opposed pair of side plate portions 22, and a plurality of space retaining plates 23 provided between the side plate portions 22 and spaced from each other in the longitudinal direction. The side plate portions 22 are arch-shaped, and connected together at their upper ends by a portion formed with the insertion hole 24 into which the pivot shaft 14 is inserted.

A plurality of bearing recesses 25 for supporting shaft ends of the roller shafts 31 are formed in each of the opposed inner surfaces of the respective side plate portions 22 and spaced from each other in the longitudinal direction of the side plate portions 22.

Figure 7:
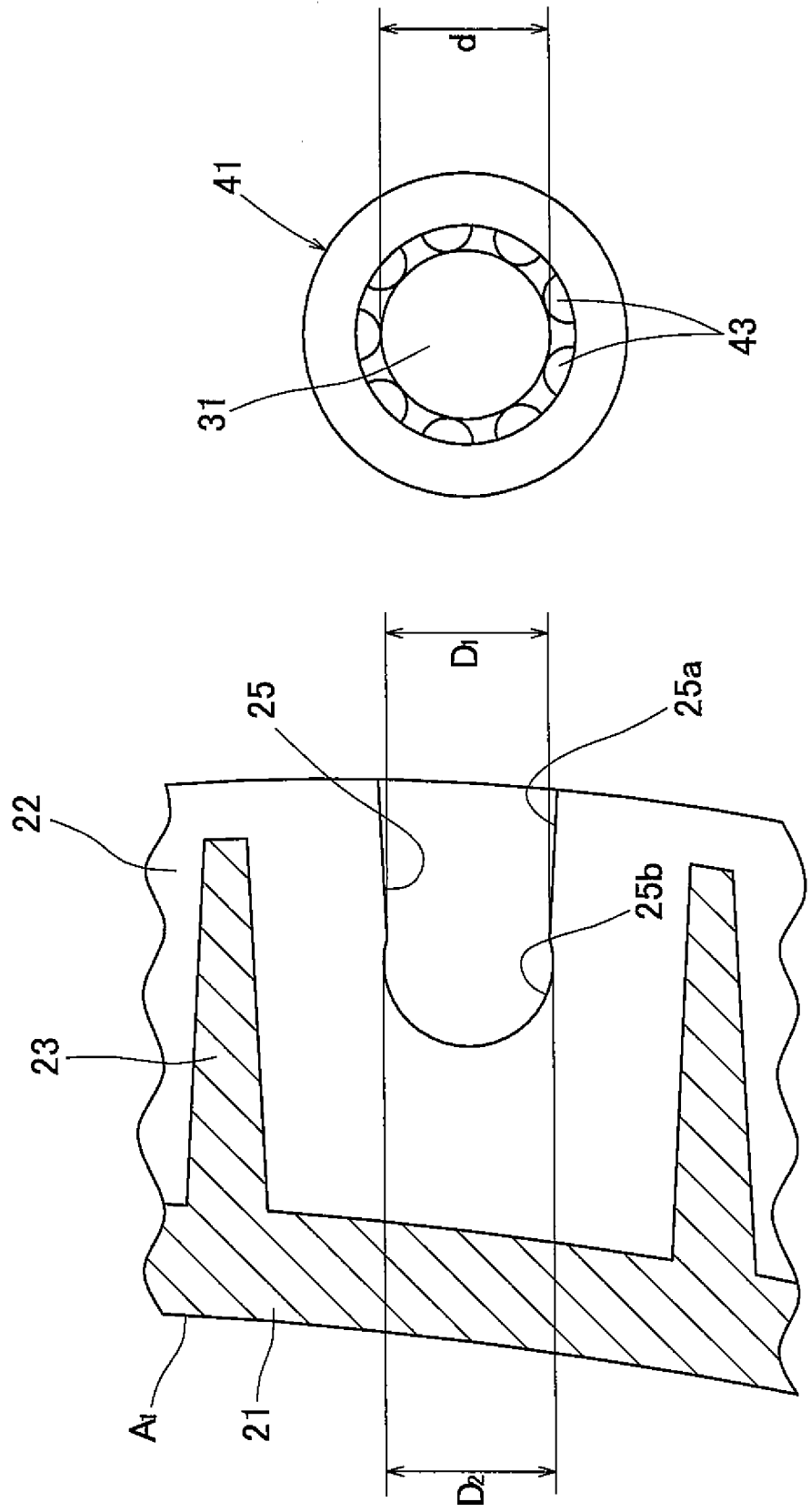
FIG. 7 An exploded front view showing a part of a guide base and the roller.

As shown in FIG. 7, the bearing recesses 25 each include a tapered groove portion 25a extending in the width direction of the side plate portion 22 from the outer side surface of the side plate portion 22, i.e. its surface facing the timing chain 5, and having a first end open to the outer side surface and a second opposite end narrower than the first end, and a circular recess portion 25b connected to the second narrow end of the tapered groove portion 25a and serving as a shaft support portion. The roller shafts 31 can be passed through the respective tapered groove portions 25b and fitted into and supported by the circular recess portions 25b.

This chain guide is designed to satisfy the relation $d > D_2 > D_1$, where $D_1$ is the width of the second narrow ends of the tapered groove portions, $D_2$ is the inner diameter of the circular recess portions, and d is the outer diameter of the roller shafts 31. With this arrangement, when the roller shafts 31 are pushed into the respective circular recess portions 25b through the taper groove portions 25a, the roller shafts are fitted and supported with interference in the circular recess portions 25b.

In the embodiment, the bearing recess portions 25 are arranged such that the centers of their circular recess portions 25b lie on a convex circular arc. But they may be arranged such that the centers of their circular recess portions 25b lie on a curved line other than a convex circular arc.

The guide base 21 is formed by molding synthetic resin. As the synthetic resin, a resin excellent in oil resistance, weather resistance, and strength is preferably used. Such resins include polyamide 46 (PA 46) and polyamide 66 (PA 66). In order to further improve mechanical strength, reinforcing glass fiber is preferably mixed into those resins.

The guide base 21 may be formed by casting or die-casting a light metal such as an aluminum alloy or a magnesium alloy.

The roller shafts 31 are fitted in the respective bearing recess portions 25. The roller shafts 31 are made of SUJ2 or SC material. In order to improve wear resistance, the roller shafts 31 are thermally treated to enhance hardness. As the thermal treatment, bright quenching is used in the embodiment. However, high frequency quenching or carburizing quenching may be performed instead. Alternatively, nitrocarburizing quenching may be performed.

Figure 6:
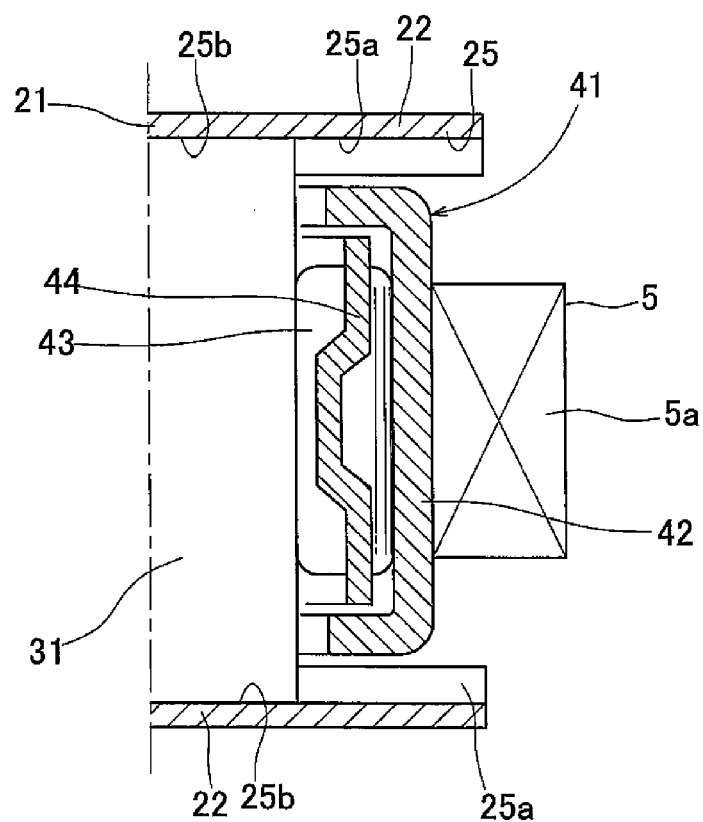
FIG. 6 A sectional view of a roller shown in FIG. 5.

The rollers 41 are rotatably supported on the respective roller shafts 31. As shown in FIG. 6, in the embodiment, needle roller bearings are used as the rollers 41. The needle roller bearings include an outer race 42, a plurality of needle roller elements 43 received in the outer race, and a retainer 44 retaining the needle roller elements 43.

The outer race 42 is made of low-carbon steel such as SPC and SCM, formed into a shell shape by drawing, and hardened by thermal treatment so that the surface hardness is about HRC 58 to 64. As the thermal treatment, the carburizing quenching or the nitrocarburizing quenching can be adopted. Alternatively, the outer race may be formed by subjecting high-carbon steel such as SUJ2 or SC material to bright quenching or the high frequency quenching.

The outer race 42 is configured such that its surface hardness is higher by 4 points or more in Rockwell hardness than the hardness of the timing chain 5 used in the chain transmission device.

The outer race 42 may be formed by cutting. Cylindrical roller bearings may be used in place of the needle roller bearings. In either case, the roller bearings may be full type roller bearings, i.e. bearings without a retainer.

The chain transmission device shown in the embodiment has the above structure. While the rotation of the crankshaft 1 is being transmitted to the camshafts 3 by the movement of the timing chain 5 looped over the driving sprocket 2 and the driven sprockets 4, fluctuations in tension of the timing chain 5 due to fluctuations in load applied are absorbed by the chain tensioner 15, preventing the chain from becoming slack and flapping.

While torque (rotation) of the crankshaft 1 is being transmitted to the camshafts 3, the respective rollers 41, which are roller bearings, of the pivotable chain guide $A_1$ and the fixed chain guide $A_2$ are rotated by contact with the timing chain 5, which is moving at high speed, so that the timing chain 5 is guided while being in rolling contact with the rollers.

Since the timing chain 5 is guided while in rolling contact with the rollers 41 in the above manner, wear of the guide surface thereof is insignificant. Movement resistance of the timing chain is also insignificant, so that the timing chain 5 smoothly moves, and the torque is transmitted without a loss.

The respective rollers 41 of the chain guide $A_1$ and the fixed chain guide $A_2$ are rotated by the contact with the timing chain 5 as described above. If rollers 41 whose surface hardness is lower than necessary are adopted, their outer diameter surfaces tend to become worn earlier due to the contact with the timing chain 5 moving at high speed. The durability of the rollers thus deteriorates.

However, since the rollers 41 of the embodiment have a surface hardness higher than the surface hardness of the timing chain 5 by 4 points or more in Rockwell hardness, rollers 41. This prevents premature wear of the outer diameter surfaces of the rollers 41 due to the contact with the timing chain 5, thus prolonging the life of the rollers.

Figure 8:
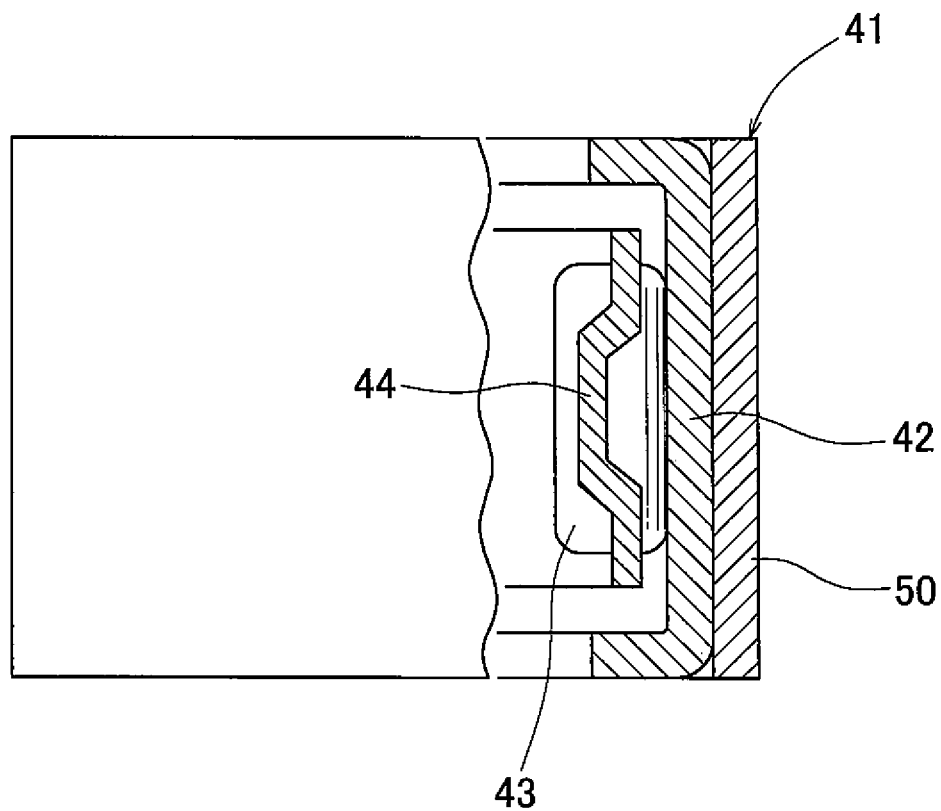
FIG. 8 A sectional view showing another example of a needle roller bearing.

FIG. 8 shows a different roller 41. This roller is also a needle roller bearing and includes a separate outer tube body 50 press-fitted onto the outer diameter surface of the shell-shaped outer race 42. The outer tube body 50 guides the movement of the timing chain 5.

In this case, the outer tube body 50 is formed by steel such as SUJ2 and SCM and hardened by thermal treatment so that the surface hardness thereof is about HRC 58 to 64 and is higher in Rockwell hardness by 4 points or more than the hardness of the timing chain 5.

If high frequency quenching, carburizing quenching, or nitrocarburizing quenching is used for thermal treatment of the outer tube body 50 shown in FIG. 8 and the outer race 42 shown in FIG. 6, a hardened layer of about HRC 58 to 64 can be formed on the surface of the outer tube body 50 or the outer race 42, and a soft layer can be provided inside the hardened layer. Therefore, in comparison to a case where the entire rollers are hardened by bright quenching, toughness of the outer tube body 50 or the outer race 42 can be enhanced, and damage to the rollers 41 can be effectively prevented.

If the shell-shaped outer race 42 is quenched to form the hardened layer, the depth of the hardened layer should be about 0.1 to 0.3 mm.

DESCRIPTION OF REFERENCE NUMERALS $A_1$, $A_2$: Chain guide
2: Driving sprocket
4: Driven sprocket
5: Timing chain (chain)
21: Guide base
22: Side plate portion
31: Roller shaft
41: Roller (needle roller bearing)
42: Outer race
43: Needle roller element

The invention claimed is:

1. A chain guide comprising:
   a guide base configured to be arranged to extend along a portion of an outer periphery of a timing chain, the guide base having side plate portions elongated in a direction in which the timing chain is moved;
   a plurality of roller shafts supported by shaft support portions formed in the side plate portions of the guide base, the roller shafts being spaced from each other in a longitudinal direction of the side plate portions; and
   a plurality of chain guiding rollers rotatably supported on the respective roller shafts, each roller having an outer diameter surface that contacts the timing chain,
   wherein the outer diameter surface of each roller is made of steel and has a hardness which is higher than a surface hardness of the timing chain by 4 points or more in Rockwell hardness.

2. The chain guide according to claim 1, wherein the hardness of the outer diameter surface of each roller is HRC 64 or less in Rockwell hardness.

3. The chain guide according to claim 1, wherein the rollers are formed by subjecting steel to a thermal treatment.

4. The chain guide according to claim 3, wherein the thermal treatment is one of bright quenching, high frequency quenching, carburizing quenching, and nitrocarburizing quenching.

5. The chain guide according to claim 3,
   wherein the thermal treatment is one of high frequency quenching, carburizing quenching, and nitrocarburizing quenching,
   wherein the outer diameter surface of each roller is an outer diameter surface of a hardened layer whose hardness is higher than the surface hardness of the timing chain by 4 points or more in Rockwell hardness, and
   wherein a soft layer is provided under each of the hardened layers.

6. The chain guide according to claim 1, wherein the rollers comprise roller bearings each including an outer race and a plurality of roller elements received in the outer race.

7. A chain transmission device comprising:
   a timing chain looped over a driving sprocket and a driven sprocket;

a pivotable chain guide provided on one side of a slack side of the timing chain, and guiding movement of the timing chain; and a chain tensioner for applying adjustment force to a remote end of the chain guide remote from a center of pivoting movement of the chain guide, thereby pressing the remote end against the timing chain, wherein the chain guide comprises the chain guide according to claim 1.

8. The chain transmission device comprising:

a timing chain looped over a driving sprocket and a driven sprocket;

a pivotable chain guide provided on one side of a slack side of the timing chain, and guiding movement of the timing chain;

a fixed chain guide provided on one side of a tight side of the timing chain, and guiding the movement of the timing chain, a chain tensioner for applying adjustment force to a remote end of the pivotable chain guide remote from a center of pivoting movement of the pivotable chain guide, thereby pressing the remote end against the timing chain, wherein each of the pivotable chain guide and the fixed chain guide is constituted by a chain guide according to claim 1.

* * * * *